United States Patent [19]

Behnke et al.

[11] 4,105,620

[45] Aug. 8, 1978

[54] STABILIZATION OF BARIUM, STRONTIUM AND CALCIUM COMPLEXES OF POLYTEREPHTHALOYL OXALAMIDRAZONE AND POLYDIPHENYLETHER-DICARBOXYLIC ACID-4,4'-OXALAMIDRAZONE

[75] Inventors: Joachim Behnke, Amorbach, Fed. Rep. of Germany; Dieter Frank, Naperville, Ill.; Michael Wallrabenstein, Wörth, Fed. Rep. of Germany

[73] Assignee: Akzona Incorporated, Asheville, N.C.

[21] Appl. No.: 780,834

[22] Filed: Mar. 24, 1977

[30] Foreign Application Priority Data

Mar. 25, 1976 [DE] Fed. Rep. of Germany ....... 2612669

[51] Int. Cl.² .................... C08G 73/08; C08L 79/06
[52] U.S. Cl. .................. 260/37 N; 8/115.5
[58] Field of Search ............ 260/37 N, 47 CP, 78 TF, 260/78 SC

[56] References Cited

U.S. PATENT DOCUMENTS

| | | | |
|---|---|---|---|
| 3,661,502 | 5/1972 | Meyer et al. | 8/115.5 |
| 3,661,836 | 5/1972 | Schopf et al. | 360/37 N |

*Primary Examiner*—Lester L. Lee
*Attorney, Agent, or Firm*—Keil, Thompson & Shurtleff

[57] ABSTRACT

A process for the stabilization of a polymer which is a barium, strontium and/or calcium complex of polyterephthaloyl oxalamidrazone or polydiphenyletherdicarboxylic acid-4,4'-oxalamidrazone wherein the polymer is treated in an acidic to neutral aqueous solution, e.g. at pH of 1 to 7, containing an acid or salt compound selected from the group consisting of oxalic acid, alkali oxalate, alkali sulfite, alkali hydrogen sulfite, alkali dithionite and alkali hydrogen sulfate. The resulting product has a much improved resistance to UV, oxidation and hydrolysis. Such polymers are especially useful in the form of flame-retardant threads, yarns, filaments, fibers, felts, fabrics and the like.

11 Claims, No Drawings

STABILIZATION OF BARIUM, STRONTIUM AND CALCIUM COMPLEXES OF POLYTEREPHTHALOYL OXALAMIDRAZONE AND POLYDIPHENYLETHER-DICARBOXYLIC ACID-4,4'-OXALAMIDRAZONE

Metal complex compounds of polyacyloxalamidrazone are disclosed in U.S. Pat. No. 3,661,836, together with a simple process for their preparation. U.S. Pat. No. 3,661,502 further describes flame resistant filaments or fibers of certain metal complex compounds of polyterephthaloyl amidrazone including the barium, strontium and calcium complexes. The structure of these polymers and their content of the various metals taken up in complex form are described in detail in both patents, the disclosures of which are therefore incorporated herein by reference as fully as if set forth in their entirety.

These known filamentary products have in common the disadvantage of poor resistance to UV, oxidation and hydrolysis. It would therefore be desirable to improve the stability and serviceability of these polymeric metal complex compounds.

One object of the present invention is to provide a process for stabilizing barium, strontium and calcium complexes of polyterephthaloyl oxalamidrazone and polydiphenylether dicarboxylic acid -4,4'-oxalamidrazone. It is also an object to make available the stabilized metal-containing polymers, expecially as a textile product.

Such objects are achieved according to the invention by a process comprising the treatment of the polymer with a neutral to acidic aqueous solution of an alkali sulfite, alkali hydrogen sulfite, alkali dithionite or alkali hydrogen sulfate or with such an aqueous solution of oxalic acid or an alkali oxalate, preferably with the proviso that the solution be within a pH range of from 1 to 7, and especially about 2 to 5.

According to the process of the invention it is possible to stabilize the barium, strontium and calcium complex compounds of polyterephthaloyl oxalamidrazone and the corresponding complex compounds of polydiphenylether dicarboxylic acid-4,4'-oxalamidrazone as described in U.S. Pat. No. 3,661,836. In particular, the process of the invention has been successfully used for the stabilization of the flame-resistant fibers which contain or which consist essentially of barium, strontium, and calcium complexes of polyterephthaloyl oxalamidrazone and polydiphenylether dicarboxylic acid-4,4'-oxalamidrazone as described in the two U.S. Pat. Nos. 3,661,836 and 3,661,502. The metal complex compounds to be stabilized contain the metals in at least about 4% by wt. and preferably about 5% by wt. up to the saturation concentration, representing at most about one gram atom of the metal based on the repeating polymer unit:

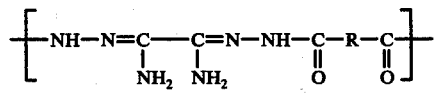

in which R is:

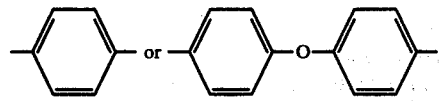

The metals are bonded to the polymer unit as in a typical chelate.

It has now been found that the stabilization achieved according to the invention can be attributed to the fact that a partial to complete decomplexing takes place and that the released metal ions coexist in the polymer substrate in the form of a salt of difficult solubility in molecular distribution, something in the nature of a "standby" or potential chelate. Where dithionite is used, the metal is precipitated in the sulfite form. Where the other agents are used, the metal is in the form of the corresponding salt of difficult solubility, i.e. the alkali sulfite and alkali hydrogen sulfite forming the corresponding alkaline earth sulfite, the alkali hydrogen sulfate yielding the corresponding alkaline earth sulfate and the alkali oxalate or oxalic acid giving the corresponding alkaline earth oxalate.

For the process of the invention, use can be made of all alkali sulfites, alkali hydrogen sulfites, alkali dithionites, alkali hydrogen sulfates and alkali oxalates. The term "alkali" is used throughout this specification to refer to the alkali metals of the periodic system. The sodium and potassium salts are preferred and, from a cost standpoint, the sodium salts are most useful. Because of the poor solubility of the salts in organic solvents, virtually only aqueous solutions can be considered. Mixtures of water and water-soluble organic solvents, e.g. low alcohols such as methanol and isopropyl alcohol can of course also be employed. However, in terms of costs and processing techniques, such mixtures are of much lesser interest.

The polymeric metal complexes are treated in a neutral to acidic aqueous medium. To achieve an extensive and rapid reaction, solutions with a pH ranging between about 2 and 5 are most preferably used. The pH of the salt solutions may be readily adjusted by means of an inorganic acid, such as nitric acid, sulfuric acid and phosphoric acid, or by means of an organic acid, such as acetic acid.

The process of the invention is most easily carried out when the metal-complexed polymers to be stabilized are in the form of extruded or shaped elements such as fibers, filaments, yarns, tows, staple fibers, woven fabrics, knits, nonwovens, felts, etc., which can be immersed in a bath solution of the oxalic acid or the named salts.

The required treatment time is primarily a function of the degree of swelling of the polymer. Freshly polycondensed and chelated material has a very high degree of swelling so that it reacts in less than one second. Products which are dried after extrusion or spinning have a relatively low degree of swelling and consequently tend to react much more slowly. The required reaction time is determined by the pH and also by the temperature of the acid or salt solution. The reaction rate increases with declining pH values. Solutions having a pH between 2 and 5 are again preferred to achieve a reasonably fast reaction. The temperature has also a marked effect on the reaction rate, and this becomes especially important when dry or finished polymers are used. The process of the invention is generally carried out at a temperature between about 20° C and the boiling point of the solution being used, preferably between about 20° and 80° C, and where alkali dithionite is used, preferably between about 20° and 50° C.

The concentration of the acid or salt solution has a much smaller effect on the reaction rate. The concentration of the salt solution should ordinarily exceed 1% by wt. but can be as high as the saturation point. Acid and salt solutions of 2 to 6% by wt. are especially preferred.

The UV stability, the oxidation resistance and the resistance to hydrolysis of the polymeric metal complexes is significantly improved by the process of the invention, without any deleterious effect on other characteristics such as temperature resistance and flame retardancy.

The process of the invention is further illustrated and is described in detail by means of the following examples, there being no intention to limit the invention to these examples. In order to simplify these examples, the oxalamidrazone polymers are abbreviated as follows:

PTO = polyterephthaloyl oxalamidrazone
PDDO = polydiphenylether dicarboxylic acid-4,4'-oxalamidrazone.

EXAMPLES 1-7

In each of these examples, dry, woven fabrics (Examples 2 and 3) or otherwise knitted material (Examples 1 and 4–7) were used as samples as obtained from spun filaments of a polyterephthaloyl oxalamidrazone metal chelate. The samples were treated at room temperature under occasional stirring with an excess of a 5% by wt. aqueous solution of the acid or salt reagents listed in the table below. For Examples 4, 5 and 7, 10% by wt. solutions were used as indicated. The progress of the reaction was observed on the basis of a color reversal from reddish brown which is the color of the PTO-metal chelates to yellow. This color change can be easily followed after a little experience to observe that a sufficient stabilization has occurred.

as evidenced by an immediate color reversal from reddish-brown to yellow.

EXAMPLE 9

A highly swollen Ca(OH)$_2$-chelated polyterephthaloyl oxalamidrazone staple fiber was reacted with a 5% by wt. aqueous solution of oxalic acid at room temperature. As in Example 8, the reaction was spontaneous.

EXAMPLE 10

Samples of a woven fabric made up of filaments or threads consisting essentially of a polyterephthaloyl oxalamidrazone strontium chelate, containing about 11% by wt. of strontium, were reacted at different temperatures with a 5% by wt. aqueous solution of equal proportions by weight of Na$_2$S$_2$O$_4$ and Na$_2$SO$_3$ at a pH value of 4. The treatment times to achieve stabilization at each specific temperature were as follows:

| Temperature | Time Required |
| --- | --- |
| 40° C | 11 min. |
| 60° C | 5 min. |
| 80° C | 2 min. |

EXAMPLE 11

Fabric samples were knitted from wet-spun PDDO filaments (313–354 dtex, 16–18 bkm and 22–28% elongation). The PDDO knit samples were treated by immersion in dimethylformamide (DMF) + 5% LiCl for 1 min., washed three times briefly with distilled water and then chelated for 16 hours at room temperature in a bath containing 15% by wt. CaCl$_2$, adjusted to a pH of 13 with concentrated ammonia. The knit samples each contained 6.4% by wt. of calcium bonded to the polymer as a complex or chelate compound.

Part of the knit material was stabilized by aftertreatment with a 5% by wt. aqueous oxalic acid solution. The stabilized PDDO knit material still contained 6.0% by wt. of calcium. Both samples, i.e. the stabilized and

| Ex. No. | Polymer chelate | Metal content % | Reagent | pH | Treatment time | After stabilizing Metal Content | After stabilizing UV stability Residual bursting tear length % | H$_2$O$_2$ Stability Residual bursting tear length % | Hydrolysis resistance, Residual bursting tear length % |
| --- | --- | --- | --- | --- | --- | --- | --- | --- | --- |
| 1 | Sr-PTO | 9.9 | Na$_2$S$_2$O$_4$ | 7.0 | 17 hrs. | 9.6 | 77 | 95 – 100 | 82 |
| 2 | Sr-PTO | 8.0 | Na$_2$S$_2$O$_4$ | 2.0 | 5 min. | 5.7 | 72 | 95 – 100 | 80 – 85 |
| 3 | Sr-PTO | 8.0 | Na$_2$SO$_3$ | 7.0 | 16 hrs. | 7.9 | 76 | | |
| 4 | Sr-PTO | 12.0 | 10% NaHSO$_3$ | | 1.5 hrs. | 9.8 | 71 | | |
| 5 | Sr-PTO | 12.0 | 10% NaHSO$_4$ | | 0.5 hrs. | 10.2 | 71 | | |
| 6 | Ca-PTO | 7.45 | Oxalic Acid | | 10 min. | 6.5 | 90 | 97 | 73 |
| 7 | Ba-PTO | 6.8 | 10% NaHSO$_4$ | | 40 min. | 5.1 | 83 | 98 | 74 |

Similarly stabilized products were obtained in the next three examples using very short treatment times depending upon the swelling capacity or degree of swelling of the filamentary sample or else upon the treatment temperature.

EXAMPLE 8

Freshly spun and cut staple fibers of a Sr(OH)$_2$-chelated polyterephthaloyl oxalamidrazone having a high degree of swelling and containing 10% by wt. Sr, were treated with a 5% by wt. aqueous Na$_2$S$_2$O$_4$ solution which was adjusted to a pH value of 4 with acetic acid. The cut fibers were immersed directly in the solution without being dried. The reaction was spontaneous the unstabilized Ca—PDDO, were exposed for 48 hours under a Xenotest light at 90% RH, followed by determination of the bursting strength. It was observed that the bursting strength of the stabilized samples was about 100% higher than the bursting strength of the unstabilized samples.

The invention is hereby claimed as follows:

1. A process for stabilizing a polymer selected from the class consisting of the barium, strontium and calcium complexes of polyterephthaloyl oxalamidrazone and polydiphenylether dicarboxylic acid-4,4'-oxalamidrazone, which process comprises treating said polymer in an aqueous solution having a pH range of 1 to 7 of a stabilizing amount of an acid or salt compound selected from the group consisting of oxalic acid, alkali oxalate, alkali sulfite, alkali hydrogen sulfite, alkali dithionite and alkali hydrogen sulfate.

2. A process as claimed in claim 1 using said aqueous solution of said acid or salt compound in a concentration of from 1% by weight up to its saturation point.

3. A process as claimed in claim 1 wherein said aqueous solution has a pH range of between 2 and 5.

4. A process as claimed in claim 1 carried out at a temperature of about 20° to 80° C.

5. A process as claimed in claim 1 wherein the polymer is treated with an aqueous solution of alkali dithionate at a temperature of about 20° to 50° C.

6. A process as claimed in claim 1 using an approximately 2 to 6% by weight aqueous solution of said acid or salt compound.

7. A process as claimed in claim 6 carried out at a temperature of about 20° to 80° C.

8. The stabilized product obtained by the process of claim 1.

9. The stabilized product obtained by the process of claim 4.

10. The stabilized product obtained by the process of claim 7.

11. A process as claimed in claim 1 carried out at a temperature of about room temperature up to the boiling point of the solution being used.